G. D. DE LORENZO.
RAZOR.
APPLICATION FILED APR. 13, 1912.
1,056,404.  Patented Mar. 18, 1913.
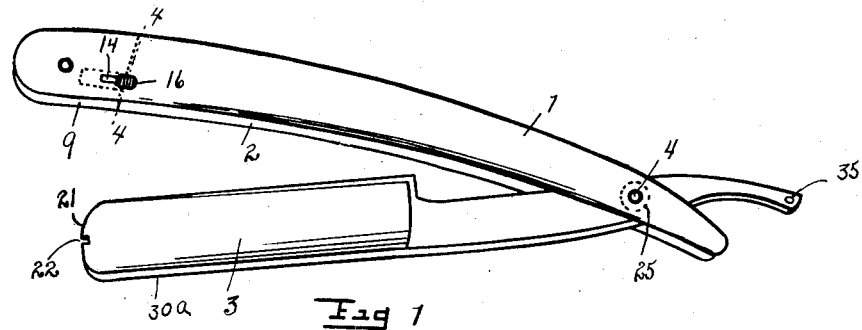
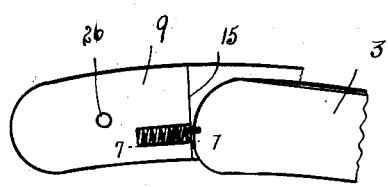 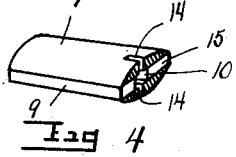 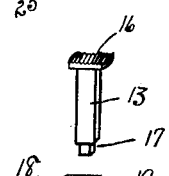
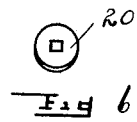
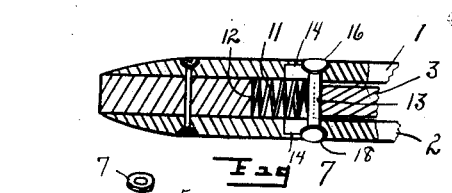 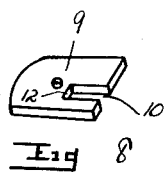
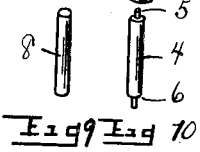 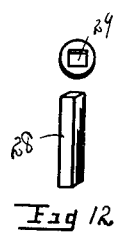 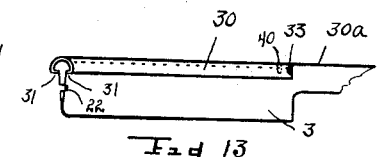 
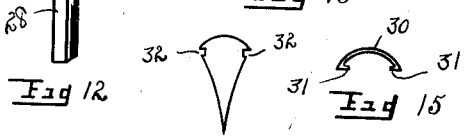 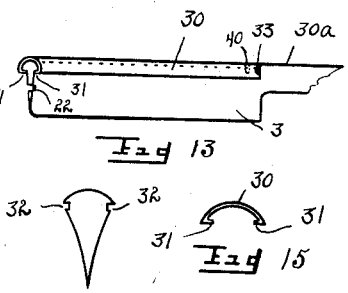  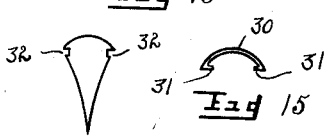 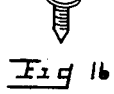
WITNESSES:
Samuel Straw
David B. Rial
INVENTOR
GUIY D. DE LORENZO.
BY Thomas L. Wilder
ATTORNEY

UNITED STATES PATENT OFFICE.

GUIY D. DE LORENZO, OF UTICA, NEW YORK.

RAZOR.

1,056,404. Specification of Letters Patent. Patented Mar. 18, 1913.

Application filed April 13, 1912. Serial No. 690,467.

*To all whom it may concern:*

Be it known that I, GUIY D. DE LORENZO, a citizen of Italy, residing at Utica, in the county of Oneida and State of New York, have invented a new and useful Razor, of which the following is a specification.

My invention relates to a razor, and I declare the following to be a full, clear, concise, and exact description thereof sufficient to enable any one skilled in the art to which it appertains to make and use the same, reference being had to the accompanying drawings in which like reference characters refer to like parts throughout the specification.

The object of the invention is to provide a razor having a locking device that will be of simple construction, efficient and adapted more particularly for holding a razor blade securely in closed position within the handle.

The device embodies a plunger adapted to engage a suitable notch disposed in the end of the blade of the razor. Said plunger is held normally in position to engage said notch in said blade by a coiled spring housed in a recess provided in an end member of the razor.

Other features will appear by reference to the drawings in which:

Figure 1 is a perspective view of a razor, showing the blade in partly open position; Fig. 2 is a side elevation of the razor, showing parts in section; Fig. 3 is an enlarged fragmentary detail view partly in section of one end of the razor, showing the locking mechanism; Fig. 4 is a detail view showing a transverse section along the line 4—4 of Fig. 1; Fig. 5 is an enlarged detail view, showing a perspective of a plunger employed, one head being removed therefrom; Fig. 6 is an enlarged detail view of a modified form of head; Fig. 7 is an enlarged fragmentary view of one end of the razor, showing a vertical section thereof along the line 7—7 of Fig. 3; Fig. 8 is a perspective view of an end member employed; Fig. 9 is an enlarged perspective view of a pivot employed; Fig. 10 is an enlarged perspective view of a modified form of pivot employed, showing a washer removed therefrom; Fig. 11 is a detail view of a washer employed; Fig. 12 is an enlarged form of modified pivot employed, showing a washer removed therefrom; Fig. 13 is a fragmentary view of a blade, showing an attachment for aid in honing the razor; Fig. 14 is an end view of the blade, enlarged, shown in Fig. 13; Fig. 15 is an enlarged end view of the attachment to aid in honing the razor; Fig. 16 is an enlarged view of a screw employed to hold an attachment to the blade of the razor.

Referring more particularly to the drawings, the upper and lower parts of the handle of the razor are represented by 1 and 2, respectively. Blade 3 is fulcrumed to one end of parts 1 and 2 by a pivot 4, whose ends may be reduced at 5 and 6 to form shoulders whereby washers 7—7 may be mounted thereon and secured by hitting the ends of pivot 4 and thereby spreading same. However, the ends of pivot 4 may be of the same circumference as the body of the pivot as seen at 8 in Fig. 9, for the assembling of washers 7, which are held thereon by spreading the ends as before described.

The ends of parts 1 and 2 of the handle of the razor opposite to those to which blade 3 is fulcrumed are held together, with member 9, therebetween by a pivot 4 and washers 7 as heretofore described with reference to the opposite or remote end of the razor.

Member 9 may be made of celluloid, aluminium, rubber or the like material and is provided with a recess 10, disposed a little to one side of its longitudinal center. Said recess 10 is adapted for the reception of a coiled spring 11 bearing at one end against the rear wall 12 of recess 10 and at the other end against plunger 13, formed to slide in slots 14—14 disposed directly opposite each other and in central longitudinal alinement with recess 10 of member 9, in parts 1 and 2 of the handle of the razor. Slots 14 extend rearwardly from edge 15 of member 9 sufficiently far, so that plunger 13 may be moved clear of edge 15 of member 9 to release blade 3 of the razor. Furthermore, said slots 14—14 are of narrower width than recess 10, whereby spring 11 disposed in said recess may be held normally in a direct line with its trend of pressure, so as not to be crowded up or down therefrom into slots 14—14.

Plunger 13 is formed with a head 16 and a lower shouldered part 17, whereby lower head 18 having a square aperture 19 may be assembled thereto by hitting the end of shoulder part 17 and spreading same. Said heads 16 and 18 may be formed oblong in shape as seen in Fig. 5, whereby there will be exposed a greater surface for the fingers to touch, when moving the plunger 13, or said heads may be formed of circular shape as 20 for neatness of appearance. The upper or exposed surface of heads 16, 18 and 20 are corrugated as seen in Fig. 5 for the purpose of preventing the finger from slipping thereon, when actuating the plunger 13.

In Fig. 2 heads 16 and 18 are shown fitted to plunger 13 at right angles to the body of said plunger, whereby to conform to a flat surface of parts 1 and 2 of the razor. In Fig. 7 heads 16 and 18 are disposed on plunger 13 at an angle, whereby to conform to the curved surface of parts 1 and 2 of the handle of the razor. In each instance, heads 16 and 18 are disposed upon plunger 13, so that their under surface will be flush with the upper surface of parts 1 and 2 of the handle, to thereby obviate any awkward protruding surface.

The operation of the lock is obvious. Blade 3 of the razor is pushed into closed position, whereupon plunger 13, at the proper moment of contact, will engage the outer end of said blade 3 at about the location indicated by 21, and will ride along said edge of said blade 3 until notch 22 thereof is reached, whereupon spring 11 constantly urging said plunger 13 outward, will force same into said notch 22 to thereby rigidly hold said blade 3 in closed position until the operator desires to open or draw out said blade, whereupon he manipulates the plunger by touching heads 16 and 18 disposed on opposite ends thereof and draws said plunger 13 rearward into slots 14—14, to clear notch 22 of blade 3. Spring 11 is held in recess 10 of member 9 by plunger 13, which is assembled, after the spring is disposed in recess 10, by placing the shouldered end of said plunger 13 through slots 14—14 and securing under head 18 to said shouldered end. There is disposed on either side of blade 3 about pivot 4 on which said blade 3 is fulcrumed, washers 25—25 which are countersunk in parts 1 and 2 of the handle and are designed to lessen the wear of the swinging blade 3 upon parts 1 and 2.

It will be observed by reference to Figs. 3 and 10 that the pivot 4, which secures the ends of parts 1 and 2 of the handle opposite to those on which blade 3 is fulcrumed, is disposed therein, so as to aline with hole 26 of member 9, in which hole 26 is located, whereby to counteract the backward pressure that spring 11 exerts against member 9. Member 9 may also be prevented from turning under the pressure of spring 11 by employing a square rivet 28 which is held in assembled position by washers having square apertures 29.

In order to prevent edge 30ª of the razor from becoming worn, which tends to render the honing of the edge of the blade difficult, there may be employed cap 30 having projections 31—31 adapted to fit into corresponding recess 32—32 formed on either side of the blade adjacent edge 30ª thereof. Cap 30 is provided with projections 33—33, whereby same may be easily slid or drawn off from its position on blade 3, which in this instance is reduced, as shown by the dotted line in Fig. 13, whereby the outer edge of cap 30 will lie flush with the edge 30ª of blade 3. Blade 3 is provided with an aperture 35 adapted to suspend the razor from a convenient peg or hook.

A small screw 40 may be employed to hold cap 30 from longitudinal movement on blade —3—, whereby the cleaning of the razor blade will not remove the attachment.

Having thus described my invention, what I claim as new and desire to secure by Letters Patent is:

In a razor, the combination of a handle comprising an upper and a lower member, an end member disposed between said upper and lower members, a square rivet for holding said end member in assembled position relative to said members of said handle, a blade pivotally secured to said handle, a notch in the end of said blade, a cam surface on the end of said blade adjacent said notch, narrow alined recesses in the upper and lower members of said handle, a recess in said end member, a plunger adapted to be slidingly mounted in said recesses, and a spring disposed in said recess in said end member, whereby to hold said plunger normally in engagement with said notch in said blade.

In witness whereof I have hereto signed my name in the presence of two witnesses.

GUY D. DE LORENZO.

Witnesses:
SALVATORE PERRETTA,
SAMUEL SLOAN.